United States Patent [19]

Wozniak

[11] Patent Number: 5,621,317
[45] Date of Patent: Apr. 15, 1997

[54] POSITION SENSOR WITH A MAGNETIC PROXIMITY SWITCH MECHANISM

[75] Inventor: Kenneth P. Wozniak, Chelsea, Mich.

[73] Assignee: Ford Motor Company, Dearborn, Mich.

[21] Appl. No.: 353,596

[22] Filed: Dec. 12, 1994

[51] Int. Cl.⁶ .................... H01H 36/00; B60K 20/00; F16H 63/40; G01B 7/30
[52] U.S. Cl. .................... 324/207.13; 74/473 R; 324/207.22; 324/207.25; 335/206
[58] Field of Search ............... 324/174, 207.13, 324/207.14, 207.15, 207.2–207.26; 74/335, 473 R; 340/456; 341/15; 307/116, 117; 335/206; 200/61.88, 61.91

[56] References Cited

U.S. PATENT DOCUMENTS

| | | | |
|---|---|---|---|
| 3,286,161 | 11/1966 | Jones et al. | 324/207.2 X |
| 3,906,469 | 9/1975 | Kronk | 324/207.13 X |
| 3,936,754 | 2/1976 | Minami | 335/206 X |
| 4,406,272 | 9/1983 | Kiess et al. | 324/207.25 X |
| 4,970,463 | 11/1990 | Wolf et al. | 324/174 X |
| 5,305,663 | 4/1994 | Leonard et al. | 74/866 |
| 5,307,013 | 4/1994 | Santos et al. | 324/207.24 X |
| 5,370,015 | 12/1994 | Moscatelli | 324/207.2 X |

FOREIGN PATENT DOCUMENTS

| | | | |
|---|---|---|---|
| 4121410 | 1/1993 | Germany | 324/207.25 |
| 05975 | 3/1994 | WIPO | 324/207.2 |

*Primary Examiner*—Gerard R. Strecker
*Attorney, Agent, or Firm*—Frank G. McKenzie; Roger L. May

[57] ABSTRACT

A position sensor having a magnetic proximity switch comprising relatively movable reeds (10, 12) having magnetic properties and a magnet (28) adapted to establish a magnetic flux field (18) that envelops the reeds (10, 12) to establish a magnetic attraction between the reeds, the strength of the magnetic flux field depending upon the spacing of the reeds with respect to the magnet, the magnetic attraction of the reeds being sufficient to cause them to move into electrical contact as the magnetic flux field in the vicinity of the reeds is changed in intensity as a magnetic shield (30) is moved through the flux field whereby the opening and the closing of a circuit defined by the reeds provides an indication of the position of the shield (30) with respect to the reeds (10, 12).

3 Claims, 5 Drawing Sheets

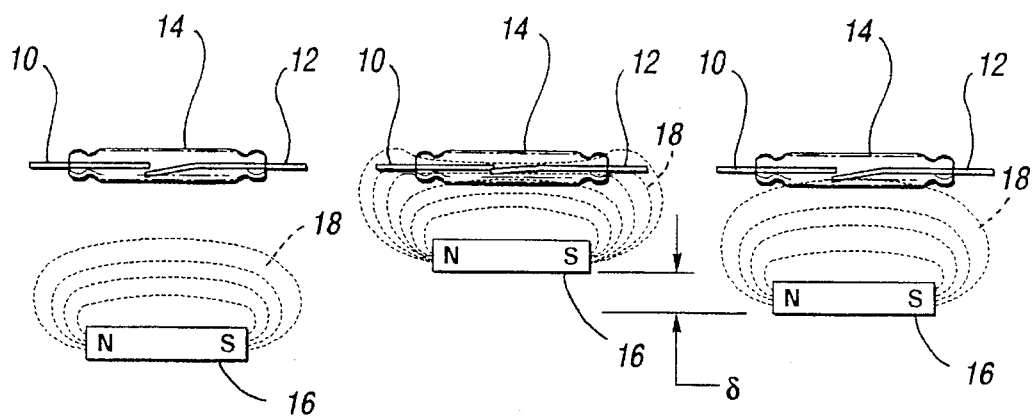
Fig. 1a Fig. 1b Fig. 1c
*PRIOR ART*
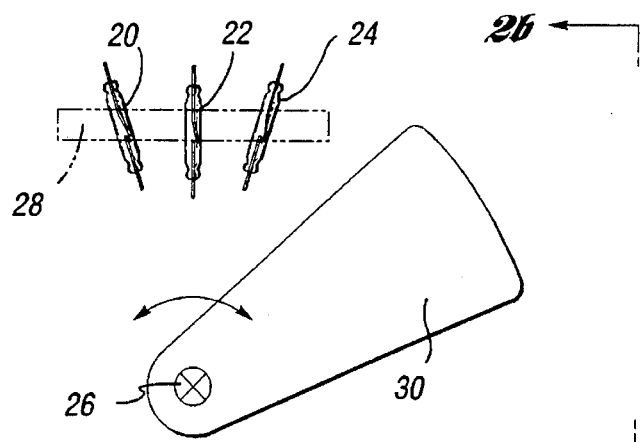
Fig. 2a
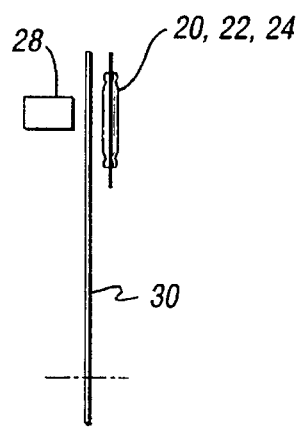
Fig. 2b

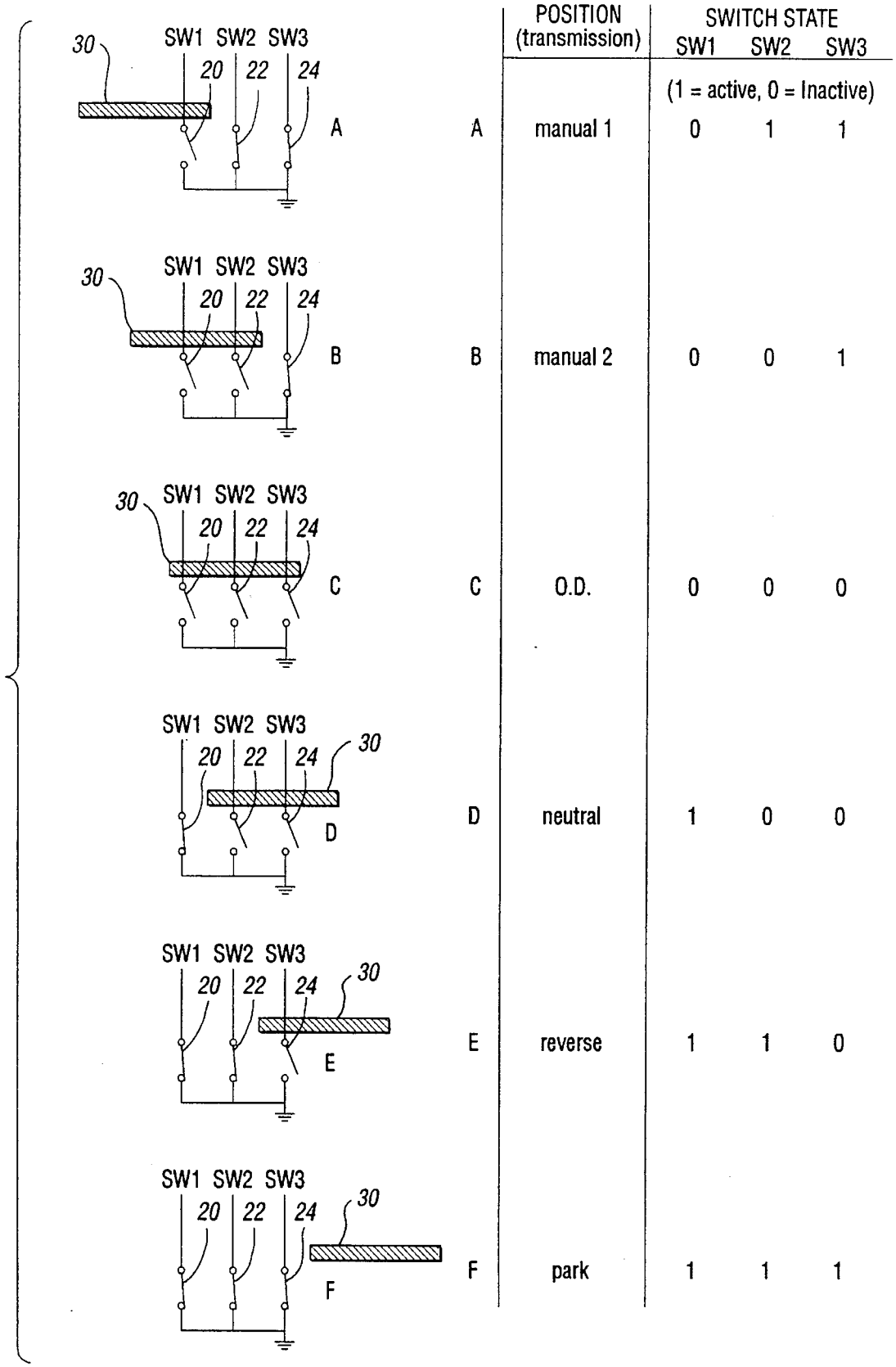
*Fig. 6*  *Fig. 6a*

5,621,317

POSITION SENSOR WITH A MAGNETIC PROXIMITY SWITCH MECHANISM

TECHNICAL FIELD

My invention relates to a control system having a movable control element with a plurality of operating positions and a position sensor for identifying each of the operating positions.

BACKGROUND OF THE INVENTION

An automotive transmission typically has multiple drive ranges with multiple ratio gearing in each range for establishing plural torque delivery paths between an engine and a torque output shaft. A driveshaft and final drive gearing deliver driving torque from the torque output shaft of the transmission to vehicle traction wheels.

An example of an automotive transmission adapted to embody the improvements of my invention is described in U.S. Pat. No. 5,305,663. That transmission includes a manual valve that can be moved between various transmission operating modes. Although my invention may be used in other transmission environments, it can be used in the transmission of the '663 patent to indicate a park position, a reverse drive mode, a neutral mode, an overdrive mode, a drive mode that omits the overdrive ratio, and a low speed drive mode.

When the transmission is conditioned for operation in the overdrive mode, any one of four forward driving ratios is available. Another forward drive mode would make available three forward driving ratios in which the highest ratio is a direct-drive. Still another drive mode would condition the transmission for operation in an underdrive mode, such as first gear ratio, with no opportunity for upshifts to higher gear ratios. The drive modes can be selected by the vehicle operator by appropriately adjusting a manual valve in a hydraulic valve assembly.

A microprocessor is used to control the operation of shift solenoid valves and pressure control solenoid valves. The microprocessor requires inputs from various engine and transmission sensors, as well as driver input information, in order to establish the appropriate functions of the transmission control system for any selected drive mode.

A manual drive range selector lever is mechanically connected to the manual valve. The position of the manual range selector lever must be read and that information must be delivered to the microprocessor so that the microprocessor can establish the proper shift schedules and the correct control pressure for any given set of operating conditions. The microprocessor also develops control functions for actuating and releasing a torque converter bypass clutch situated between the engine and the gearing of the transmission.

It is known design practice to use a transmission range selector switch for indicating the position of a driver-controlled drive range selector lever. The switch includes a first switch member having multiple contact points and a movable wiper element that engages the contact points on the switch assembly. Such a range selector position indicator switch may provide a false lever position if the switch contacts should become contaminated or if the relatively movable switch contacts or wiper elements become worn. In either case, an unreliable selector lever position signal might be made available to the microprocessor.

GENERAL DESCRIPTION OF THE INVENTION

My invention provides an accurate position indication without the shortcomings associated with known selector lever position indicators of the kind described in the preceding discussion. It does not require physical contact between relatively movable switch members due to a wiper action of a movable switch element with respect to switch contacts.

My improved switch construction is adapted especially for low level voltage signal applications because of its inherent sensitivity.

Although my invention may be used in control systems other than automatic transmission control systems for purposes other than for the purpose of indicating the position of a manually adjustable lever, I will describe the invention in the environment of a transmission system of the kind shown in the '663 patent.

Proximity switches comprising two adjacent nickel iron blades or reeds are mounted on a stationary portion of the transmission mechanism adjacent a rotary shaft that in turn is connected mechanically to a driver-controlled range selector lever. A stationary, permanent magnet is mounted on the stationary portion of the transmission in close proximity to the reeds of the switches. An electromagnet also may be used, as will be explained subsequently. The magnetic flux field established by the magnet intersects the reeds of each switch, thereby magnetizing the switch reeds and causing them to move into electrical contact. When each switch is closed in this fashion, an electrical signal can be delivered through the switch from a signal voltage source to the microprocessor.

A magnetic flux metal shield is carried by a rotary shaft that is connected to a driver-operated range selector lever. Several reed switches can be arranged in a predetermined pattern. The shield, which is carried by the rotary shaft that is actuated by the driver-operated range selector lever, may pass between the magnet and the switches thereby selectively interrupting the flux field between the selected switches and the magnet. When the flux field for a switch is interrupted, the switch is opened. When the shield moves to an adjacent position, the switch that had been open is closed once again.

The switches are arranged relative to the shield so that as one switch is opened another is closed. In this way, voltage signals can be distributed to the microprocessor to define a digital code for each position of the driver controlled range selector lever. Each position of the range selector lever thus can be identified with a discrete digital code. The coded information defining each position of the range selector lever then can be used by the microprocessor to develop appropriate control output signals for the purpose of establishing shift points and circuit pressures for each set of driving conditions.

Although the shield is mounted on a rotary shaft for the range selector of the present embodiment of the invention, I contemplate that the shield, in this embodiment, could be moved in a linear path rather than a rotary path.

BRIEF DESCRIPTION OF THE DRAWINGS

FIGS. 1a, 1b and 1c show a prior art magnetic sensor reed switch wherein the switch is opened, is closed and is reopened depending on the spacing between a permanent magnet and the switch reeds;

FIGS. 2a, 2c and 2d show various positions of a magnetic flux field shield relative to sensor reed switches;

FIG. 2b is a side view of the switch assembly and shield of FIG. 2a as seen from the plane of section line 2b–2b of FIG. 2a;

FIG. 6 is a schematic representation of the switching circuit of my invention in combination with a magnetic shield; and FIG. 6a is a table showing the digital output information that is developed by the switching arrangement of FIG. 6.

PARTICULAR DESCRIPTION OF THE INVENTION

A reed switch known in the prior art is illustrated in FIG. 1a. It consists of two nickel-iron blades or reeds 10 and 12 which may be plated with a noble metal over the contact areas for the reeds. The reeds are aligned, one with respect to the other, and are hermetically sealed in a glass tube 14 that is filled with an inert gas; e.g., pure nitrogen. The inner ends of the reeds are situated in close proximity, one with respect to the other, as indicated. The outer ends of each reed form a part of a switching circuit.

A permanent magnet 16 is situated adjacent the reeds 10, 12. The magnet develops a flux field 18. In the case of the position of the magnet 16 in FIG. 1a, the flux field will not intersect the reeds. Thus, the reeds are not magnetized and they assume an open circuit position. In FIG. 1b the magnet 16 is relatively close to the reeds 10 and 12, thus causing the reeds to be magnetized, one with respect to the other. This causes the reeds to move into electrical contact as indicated. When the magnet 16 moves away from the reeds, as indicated in FIG. 1c, the reeds move out of electrical contact as indicated as the flux field 18 no longer intersects the reeds. The distance δ between the two magnet positions in FIGS. 1b and 1c is an indication of the hysteresis that is inherent in the reed switch assembly.

The reeds will move into contact as the magnetic field is moved closer to the reeds. The point at which the reeds will move into electrical contact depends upon the strength of the magnet and the sensitivity of the reeds.

Figure 2C:
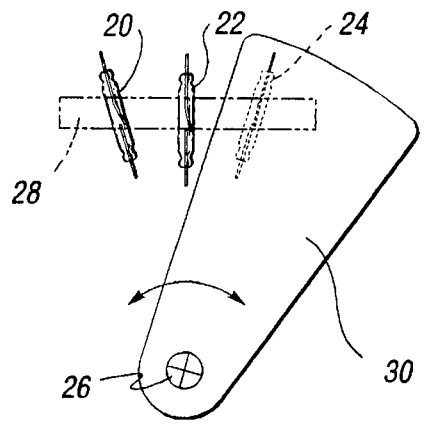
Figure 2B:
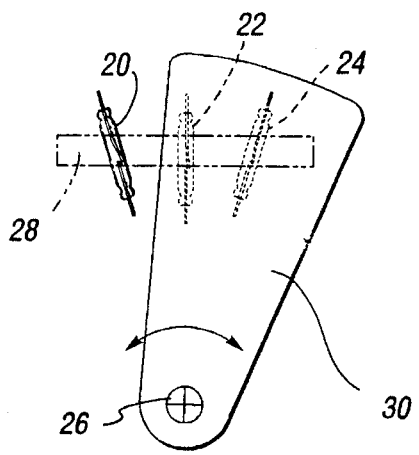

FIGS. 2a, 2b, 2c and 2d show in schematic form an embodiment of my invention wherein reed switches 20, 22 and 24 are arranged in arcuate positions about a center 26. A permanent magnet 28 is mounted adjacent the reed switches, although an electromagnet, rather than a permanent magnet, also may be used as mentioned previously. As indicated in FIG. 2b both the magnet 28 and the reed switches 20–24 are fixed, unlike the prior art design of FIGS. 1a–1c. The distance between the switches and the magnet 28 is held constant. A metallic shield 30 is situated between the magnet 28 and the switches 20–24. The metallic shield 30 extends radially from a rotary shaft having a center rotation at the center 26. The shield can be rotated across the plane of the switches 20–24, which are arranged as shown in FIGS. 2a, 2c and 2d in a single arcuate track pattern. In the position shown in FIG. 2C, the shield is interposed between the magnet and switch 24. This interrupts the flux field that normally would envelope the switch 24, thereby causing the switch 24 to assume an open circuit condition. The shield 30 is remotely situated in FIG. 2c with respect to reed switches 20 and 22. Thus switches 20 and 22 assume a closed circuit condition while switch 24 assumes an open circuit condition.

If the shield 30 is rotated farther, as indicated in FIG. 2d, it interrupts the flux field for both switches 22 and 24. This causes the switches 22 and 24 to assume an open circuit condition as switch 20 remains closed.

FIG. 6 shows a diagram of the logic states that can be established as the magnetic shield moves from one angular position to another. There are six states indicated in FIG. 6, each state being designated by a separate letter; i.e., A through F respectively. In diagram A of FIG. 6, the switch 20 is opened as magnetic shield 30 is situated adjacent switch 20 and removed from switches 22 and 24. This causes switches 22 and 24 to close as switch 20 opens. The open state and the closed state are indicated in digital logic form. As shown in FIG. 6a, an open switch is indicated by the symbol "0", which is an inactive state, and a closed switch is indicated by the symbol "1", which is the active state. The combination of the states is read as a digital code 011, as indicated at location A of FIG. 6a. Those states are transmitted to the microprocessor, which converts the digital code into a digital instruction in which each element of the code designates a discrete bit of the digital word that comprises the instruction.

If the shield 30 moves to the right as indicated at location B of FIG. 6, the flux field is interrupted for switches 20 and 22, thereby causing those switches to open as switch 24 remains closed. This corresponds to a digital code of 001 as seen in FIG. 6a. The information in the code is transmitted to the microprocessor as explained above. Each symbol "0" and each numeral "1" designates a discrete bit of the word that comprises the instruction.

As the shield 30 is moved farther to the right as indicated at location C of FIG. 6, all three switches are shielded and they all are therefore in an open state. This corresponds to the operational code 000 in FIG. 6a.

If the shield 30 moves still farther to the right, switch 20 becomes unshielded. Therefore, the magnetic flux field again will close that switch as the switches 22 and 24 assume an open state. This causes a change in the digital code to 100.

Further movement of the shield 30 to the right interrupts the flux flow path for switch 24 as the flux flow path for switches 20, 22 maintain those switches in a closed state. This corresponds to the digital code 110, as indicated in location E of FIG. 6A.

When the shield is moved out of proximity to all the switches, the switches 20, 22 and 24 again assume their closed states. This corresponds to the digital code 111, as indicated at location F of FIG. 6a.

It should be noted that the switches, as the shield 30 is moved across them, will be individually actuated as the states for the other switches remain unchanged. That is, a circuit for one switch will be completed as the shield passes over it before a circuit for an adjacent switch is opened as the shield covers the adjacent switch. This avoids a condition which might result in a switch assembly wherein paired switches must be actuated in tandem as a selector lever moves from one position to another; i.e., a condition in which one switch state must change at the instant an adjacent switch state changes. There is a desirable overlap in the changes in the states of the adjacent switches. This avoids false readings when an indeterminate switch state would be interposed between the changes in the states of the two switches. This improves reliability of the sensor and it simplifies its calibration. A circuit for one switch is "made" before the circuit for another switch "breaks."

The microprocessor will identify the codes of FIG. 6a and assign a position of the range selector lever to each code. The code at location A may correspond to the manual-low position of the range selector lever. The code at location B may correspond to the manual second ratio position of the range selector lever. The overdrive position of the range selector lever is indicated by the code at location C. The neutral position is indicated by the code at location D. The reverse drive position of the manual selector lever is indicated by the code at location E. Finally, the park position of the manual range selector lever is indicated by the code at location F of FIG. 6a.

Figure 5:
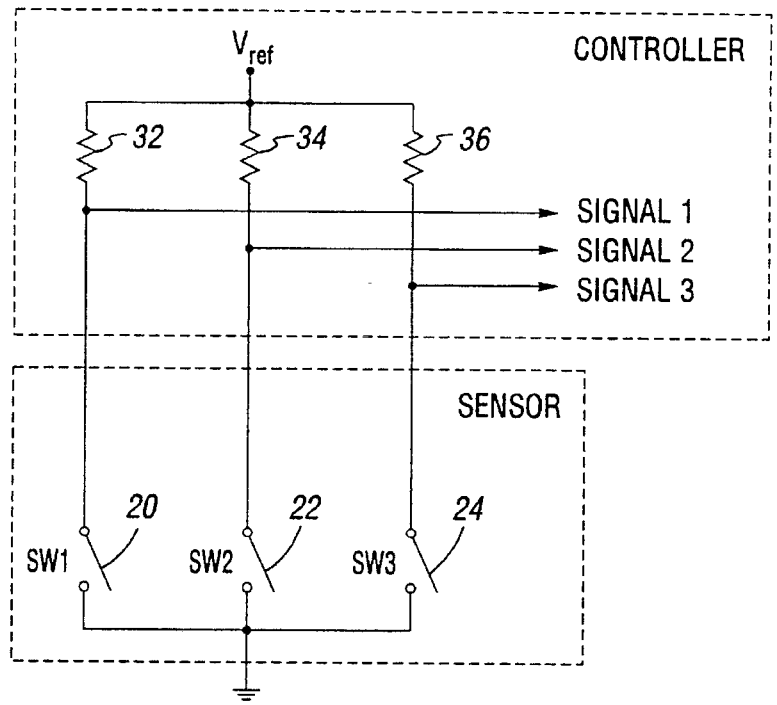
FIG. 5 is a schematic diagram of the switch circuit for the sensor of my invention.

FIG. 5 shows a circuit for the switches, which develops the signals that are transferred to the microprocessor to designate the various operating positions for the manual selector lever. A reference voltage, as seen is in FIG. 5, is applied to one side of resistors 32, 34 and 36, which respectively are connected to one side of switches 20, 22 and 24. The voltage drop across the resistor 32 is used as a signal designated as signal "1", which corresponds to a digital "0" or a digital "1" of the digital code indicated at location A in FIG. 6a. The signal voltage is either high or low depending upon whether the switch 20 is opened or closed. Similarly, resistor 34 develops a digital state for the second bit of the digital code at location B of FIG. 6a. This develops signal "2", which is a voltage that is either high or low, depending upon whether the switch 22 is open or closed.

In a similar fashion, resistor 36 develops a high or low state for signal "3", which is the third bit of a digital code indicated in FIG. 6a.

Figure 3:
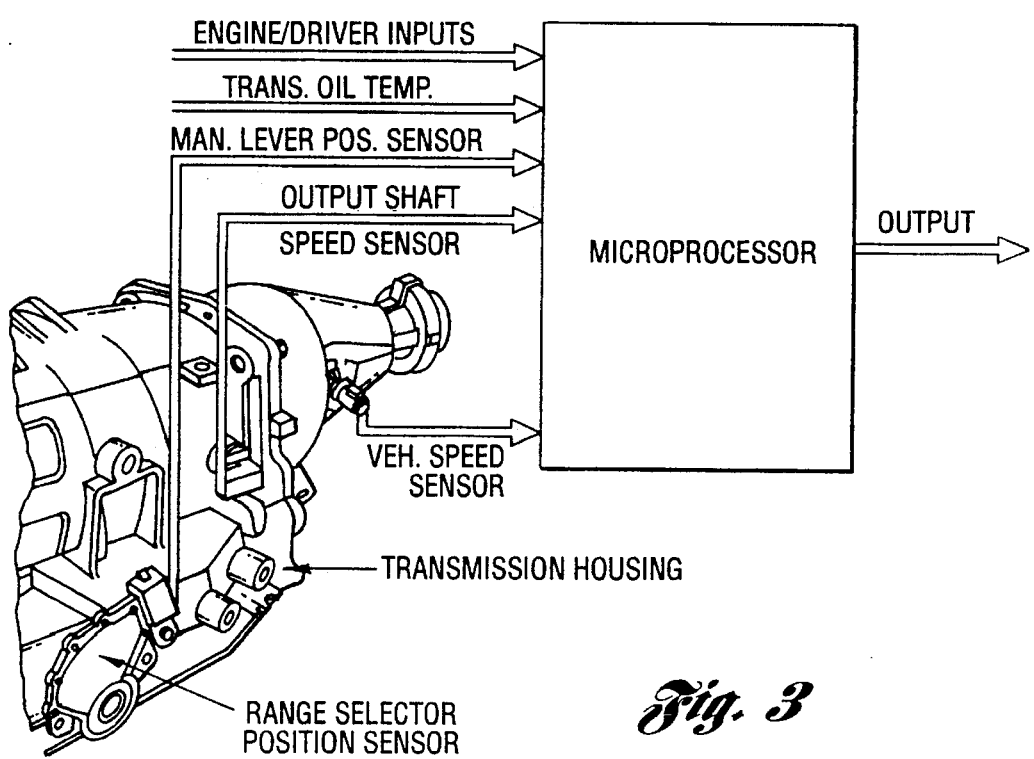
FIG. 3 is a schematic illustration of the transmission wherein the range selector lever position sensor is mounted on the exterior of the transmission housing.

FIG. 3 shows in schematic form a transmission housing with a range selector position sensor on the exterior of the housing. A microprocessor used to control the transmission and the internal combustion engine for the vehicle is shown in block diagram form with driveline input information flow paths.

Figure 4:
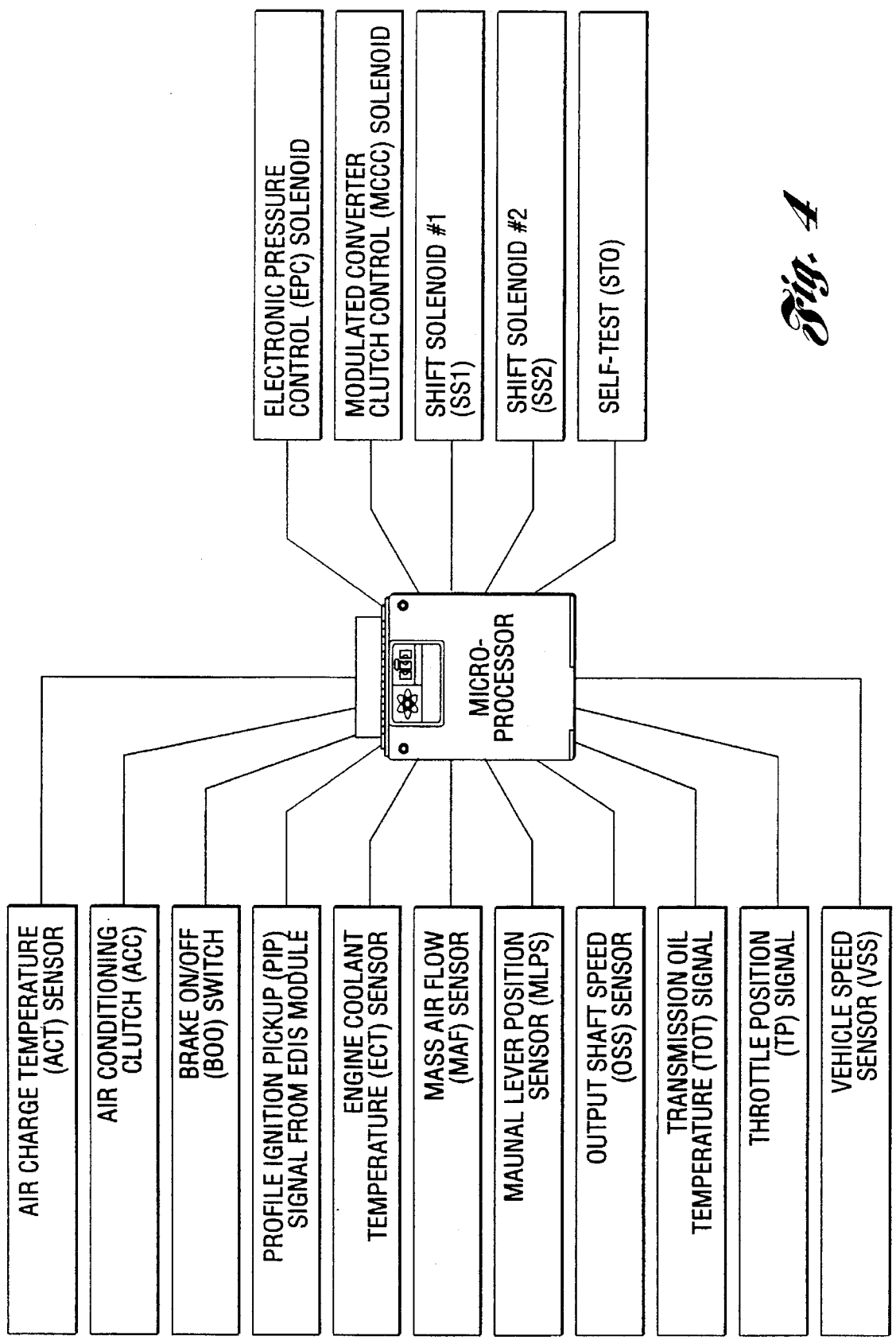
FIG. 4 is a schematic overview of the microprocessor used for controlling a transmission of the kind shown in the '663 patent together with signals from the various sensors that provide input information to the microprocessor and a listing of the output functions of the microprocessor.

FIG. 4 shows in block diagram form the microprocessor of FIG. 3 with the input data indicated more completely and with output data shown at the right side of the figure. As seen in FIG. 4, the manual range selector lever position sensor (MLPS) in one of several input signal sensors.

Figure 5A:
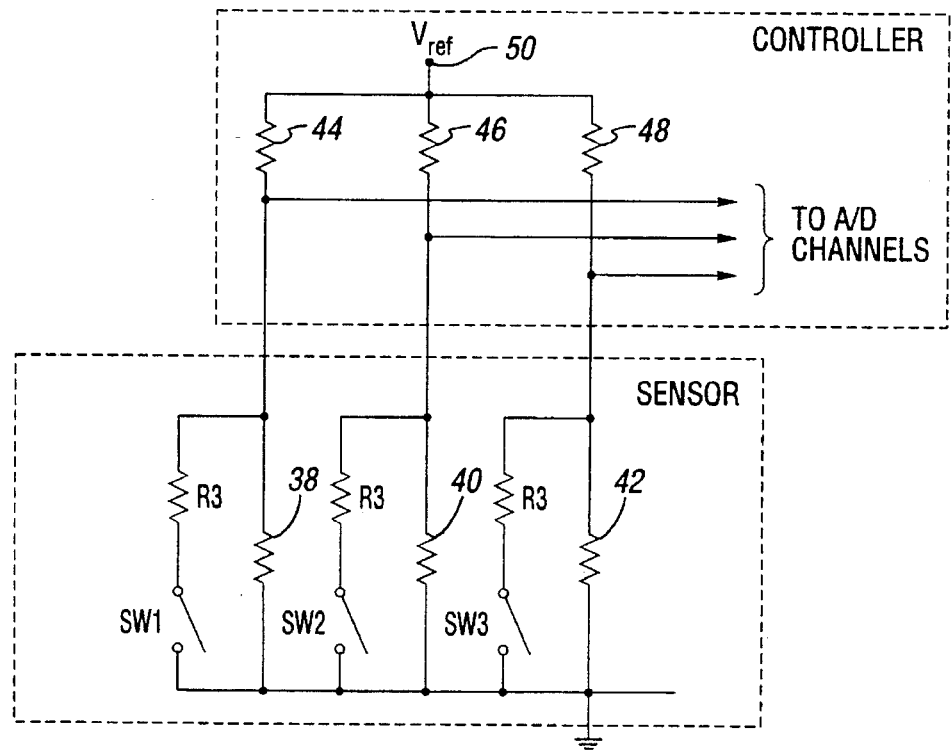
FIG. 5a is an alternate circuit for the sensor of my invention.

FIG. 5a shows an alternate switching circuit wherein a second resistor 38, 40 and 42 is located in the switch circuits for switches 20, 22 and 24 respectively. Resistor 38 forms a voltage divider circuit together with resistor 44. Resistor $R_3$ is situated intermediate resistors 38 and 44. Resistors 38 and 44 are sized so that the analog-to-digital voltage equals approximately 90% of the reference voltage at 50. $R_3$ is sized so that the analog-to-digital voltage is equal to approximately 10% of the reference voltage at 50 when the switches are closed.

If there is a short or open circuit in the wiring harness that leads from the switching circuit of FIG. 5a to the microprocessor, the analog-to-digital voltage at the output channels will go to ground. Thus, the circuit of FIG. 5a can distinguish between an open switch state and an open circuit in the analog-to-digital channels. This is a valuable diagnostic tool because a malfunction in the analog-to-digital channels can be detected if the analog-to-digital voltage should fall to zero. That will tell the diagnostic technician that a fault has occurred in the channel circuit, rather than in the switch circuit itself. An open circuit condition resulting in a zero voltage can readily be distinguished in this way from an open switch condition where the analog-to-digital voltage would be 10% of the reference voltage.

The switch circuit of FIG. 5a will make it possible to detect a short in the resistor circuits for resistors 44, 46 and 48 since the resulting zero voltage output would be distinguishable from a normal voltage reading for an open switch.

Although an open circuit for resistors $R_3$ cannot be detected, a short in the $R_3$ resistor circuits can be detected as in the case of a short in resistors 44, 46 and 48.

If a short of the reference voltage source ($V_{ref}$) to the battery voltage ($V_{batt}$) occurs, that too can be detected because all three signals would then read zero.

As mentioned earlier, it would be possible to use electromagnets in the position sensor circuit of my invention rather than permanent magnets. This would result in a pulsing magnetic field for each switch when the windings for the magnets are subjected to a pulsing or alternating voltage. The signals that would correspond to the three signals shown in FIGS. 5a and 5b then would be pulsating signals.

A pulsing magnet would make it possible to have control over the magnetic field for the magnet.

The pulsing electromagnet also would add another diagnostic tool because the diagnostic technician then would be able to distinguish a switch that has failed in the closed position from a normal switch. A failed switch, if closed, would transmit a signal that would be of constant value, not pulsing.

It will be apparent to those skilled in the art that modifications to my invention particularly described here may be made without departing from the scope of my invention.

Having described a preferred embodiment of my invention what I claim and desire to secure by U.S. Letters Patent is:

1. A transmission range selector position sensor for an automatic transmission having a driver operated ratio range selector lever, a rotary shaft connected to said selector lever;

said range selector position sensor comprising encapsulated proximity switches having moveable metallic reeds and arranged in a single arcuate track pattern;

a magnet adjacent said switches, said magnet having a magnetic flux field that envelops said reeds;

a magnetic shield connected to and rotatable with said rotary shaft and disposed in a plane of movement between said magnet and said switches, said magnetic shield having a leading edge and a trailing edge as it moves in an arcuate motion path, the arcuate distance between said leading and trailing edges being at least as great as the arcuate dimension of said track pattern whereby said leading edge selectively covers said switches as said magnetic shield moves arcuately in one direction thereby causing selective opening of said switch and whereby said trailing edge selectively uncovers said switches as said magnetic shield continues to move in said one direction thereby causing selective closing of said switches;

means for moving said rotary shaft from one angular position to another including said driver operated ratio range selector lever to selectively interrupt said flux field for said switches thereby actuating said switches to effect an open switch state and a closed switch state; and a switch circuit for developing a discrete voltage signal for each of said switches that depends upon the position of said range selector lever with respect to said switches, said switch circuit including a voltage source and a resistor between said voltage source and each of said switches, one side of each of said resistors being connected to said voltage source and the other side of each of said resistors being connected to a separate one of said switches, whereby the number of discrete voltage signals is equal to twice the number of said switches, and electronic processor means for converting each discrete voltage signal to a digital value indicative of switch states, said electronic processor means including separate voltage inputs connected to the other side of each of said resistors.

2. The combination as set forth in claim 1 wherein said shield is movable relative to said switches to selectively interrupt a flux field for each switch to establish an open switch state;

said electronic processor means converting detected open and closed switch state patterns to a separate digital code that is unique for each operative position of said range selector lever.

3. The combination as set forth in claim 2 wherein said switch circuit includes a pair of calibrated resistors for each switch defining a voltage divider, one of each of said calibrated resistors comprising said first-named resistor for that switch;

analog-to-digital channels connected to each of said switches at a location between the resistors of each of said resistor pairs, said resistors being connected in series, and a third resistor for each of said switches disposed in series with that switch and connected to said series-connected resistors for that switch at a location between said series-connected resistors.

* * * * *